United States Patent
Corso et al.

(10) Patent No.: US 7,869,098 B2
(45) Date of Patent: Jan. 11, 2011

(54) SCANNING VERIFICATION AND TRACKING SYSTEM AND METHOD

(75) Inventors: Steven J. Corso, Livonia, MI (US); Adrienne L. Way, Warren, MI (US)

(73) Assignee: Edcor Data Services Corporation, Pontiac, MI (US)

( * ) Notice: Subject to any disclaimer, the term of this patent is extended or adjusted under 35 U.S.C. 154(b) by 879 days.

(21) Appl. No.: 11/763,873

(22) Filed: Jun. 15, 2007

(65) Prior Publication Data

US 2008/0002234 A1 Jan. 3, 2008

Related U.S. Application Data

(60) Provisional application No. 60/817,875, filed on Jun. 30, 2006.

(51) Int. Cl.
*H04N 1/04* (2006.01)

(52) U.S. Cl. ........................ 358/405; 358/474; 358/486; 358/496

(58) Field of Classification Search .................. 358/405, 358/474, 486, 496, 497
See application file for complete search history.

(56) References Cited

U.S. PATENT DOCUMENTS

| 6,748,098 B1 * | 6/2004 | Rosenfeld | .................... 382/131 |
| 7,076,091 B2 * | 7/2006 | Rosenfeld | .................... 382/131 |

* cited by examiner

*Primary Examiner*—Houshang Safaipour
(74) *Attorney, Agent, or Firm*—Foley & Lardner LLP

(57) ABSTRACT

A method and device are provided for assigning a task to a user to verify information from a scanned document. An image, a data item, and a data field are presented to a user. The image is associated with at least a section of a scanned document. The data item is identified from a portion of the image. The data field is associated with the data item. A second data item is received. The second data item is entered by the user in the data field and indicates a correction to the data item to reflect the portion of the image. An error rate is updated based on the received second data item. The user is selected to process a task based on the updated error rate. The task is presented to the selected user.

19 Claims, 17 Drawing Sheets

Quality and Time Tracking System Verification — 70

Course Information

| Type | Course # | Course Description | Credits | Job Related? | Tuition | Books | Fees | Estimated Total |
|------|----------|--------------------|---------|--------------|---------|-------|------|-----------------|

Did you complete a Statement of Purpose? ☐

Receiving other financial aid? ☐ Source: _____

Mandatory Fees
Subtract Financial Aid
Total Estimated Cost

<<Previous Section — 72                    Next Section>> — 74

| Field Name | Current Data | Corrected Data | Illegible |
|------------|--------------|----------------|-----------|
| Course 1 Credits | 2.0 | | ☐ |
| Course 1 Course Type | U | | ☐ |
| Course 1 Mode of Delivery | Traditional | | ☐ |
| Course 1 Job Related | Y | | ☐ |
| Course 1 Tuition | 100.00 | | ☐ |
| Course 1 Books | 25.00 | | ☐ |
| Course 1 Fees | 15.00 | | ☐ |
| Course 2 Credits | 3.0 | | ☐ |
| Course 2 Course Type | N | | ☐ |
| Course 2 Mode of Delivery | Online | | ☐ |

— 73         — 75         — 77         — 79

| Field Name | Current Data | Corrected Data | Illegible |
|------------|--------------|----------------|-----------|
| Course 2 Credits | 2.0 | | ☐ |
| Course 2 Course Type | U | | ☐ |
| Course 2 Mode of Delivery | Traditional | | ☐ |
| Course 2 Job Related | Y | | ☐ |
| Course 2 Tuition | 100.00 | | ☐ |
| Course 2 Books | 25.00 | | ☐ |
| Course 2 Fees | 15.00 | | ☐ |
| Course 3 Credits | 3.0 | | ☐ |
| Course 3 Course Type | N | | ☐ |
| Course 3 Mode of Delivery | Online | | ☐ |

Main Page

Next Piece of Work>>
End

FIGURE 5

School Search

State: Choose a state ▼

School Name: [          ]

[ Search ]

Main Page   Logout

---

Choose a state ▼

[ Back ]

---

Invoice Checklist

Invoice# : [          ]

<checklist item 1>  ☐
<checklist item 2>  ☐

[ Enter ]

FIGURE 6

Main Page   Logout

Select Employee

Employee ID: [          ]

[ Select ]

Confirm Employee

Employee Name: [          ]

Is this the correct employee?

[ Yes ] [ No, Select Again ] [ No, Employee Not Found ]

Enter Email Address

Email Address: [          ]

[ Enter ]

FIGURE 7

Find the application represented on the invoice. Enter the amount next to the application information and press Enter.

Employee ID: <employee ID>    select different employee
Employee Name: <Last Name>, <First Name>

Course Number and Name

| Term Start | Term End | Course 1 | Course 2 | Course 3 | Course 4 |
|---|---|---|---|---|---|
| 1/1/06 | 3/4/06 | ENG101, Intro to English | CALC320, Differential Eq | PHYED234, Bowling | <Number4>, <Name4> |
| 12345678 | 12345678 | 12345678901234567890 | 12345678901234567890 | 12345678901234567890 | 12345678901234567890 |

Invoice Complete
Is the invoice complete?
[Yes] [No]

More Work
[Next Piece of Work] [End]

Main Page    Logout

FIGURE 8

| | | Main Page Logout |
|---|---|---|
| Change School | School: <school name>, <vendor number><br><school address>, <school city>, <state>, <zip> | |
| | Invoice #: 12345678901234 5 | |
| | Check list: <check list item 1> ☒<br><check list item 2> ☐ | |

Application Info

| | Employee | Course 1 | Course 2 | Course 3 |
|---|---|---|---|---|
| Change Employee | 1234567890 | 12345678901234567890 | 12345678901234567890 | 12345678901234567890 |
| Remove Employee | <Employee Name> | | Term Dates 1/1/06 -- 3/4/06 | |
| Change Application | | Amount [$12345.67] | | |
| Change Employee | 1234567890 | 12345678901234567890 | 12345678901234567890 | 12345678901234567890 |
| Remove Employee | <Employee Name> | | Term Dates 1/1/06 -- 3/4/06 | |
| Change Application | | Amount [$12345.67] | | |
| Add Employee | | | | |

Next Piece of Work>>
End

FIGURE 9

Employer Bill

University of Phoenix

Invoice Date: 10 Feb 2006
Invoice # : 539884:ONL

Bill to:
Eaton Corporation
PO BOX 214679
Auburn Hills, MI 48326
United States

Remit to:
University of Phoenix
Online Campus
3157 East Elwood Street
Phoenix, AZ 85034

Fax to: 248-836-2083

Attn: Eaton

===================================================
Johnson, Alex E          576-35-6548
PHL 251 Critical Thinking 3      31-Jan-06   28-Feb-06
===================================================
Amount Due                                $1425.00
===================================================
Total Amount Due                          $1425.00

Please contact Lynn Warner @ 602-387-7044 with any questions.
Thank you!

PAYMENT DUE UPON RECEIPT
PLEASE REFERENCE INVOICE # ON REMITTANCE

<<Previous Page      Page X of Y      Next Page>>

[+] Zoom [-]    [↶] Rotate [↷]

FIGURE 10

Quality and Time Tracking System
Maintain Settings

Main Page    Logout

| Delete Setting | Form Type | Client | Employee | Sample Size | Percent Error | Verify 1 Every X | End Date | |
|---|---|---|---|---|---|---|---|---|
| | Form Type Default | ▽ | ▽ | ▽ | | | | |
| | | | | 500 | 0 | 20 | | |
| | | | | | 1 | 10 | | |
| ☐ | | | | | 2 | 5 | | Delete Row |
| | | | | | 3 | 2 | | Add Row |
| | Process Request Form | | | 300 | 0 | 10 | | |
| | | | | | 1 | 5 | | |
| ☐ | | | | | 2 | 3 | | Delete Row |
| | | | | | 3 | 2 | | Add Row |
| | Application | Client 1 | | 500 | 0 | 20 | | Add Row |
| ☐ | | Client Default | | 500 | 0 | 20 | | |
| | | | | | 1 | 10 | | |
| | | | | | 2 | 5 | | Delete Row |
| | | | | | 3 | 2 | | Add Row |
| ☐ | | Client 1 | | 300 | 0 | 1 | 6/1/06 | Add Row |
| | | | Employee Default | 500 | 0 | 20 | | |
| | | | | | 1 | 10 | | |
| ☐ | | | | | 2 | 5 | | |
| | | | <Employee Name 1> | 200 | 2 | 5 | 1/1/06 | Delete Row |
| | | | | | 3 | 2 | | Add Row |
| ☐ | Process Request Form | Client 2 | <Employee Name 2> | 300 | 0 | 2 | 7/1/06 | Add Row |

FIGURE 11

Main Page    Logout

Select Form Type

-No Form Type Selected-
<Form Type 1>
<Form Type 2>
<Form Type 3>

Select Client

-No Client Selected-
<Client 1>
<Client 2>
<Client 3>

Select Employee

-No Employee Selected-
<Employee 1>
<Employee 2>
<Employee 3>

OK    Cancel

FIGURE 12

Quality and Time Tracking System

Main Page    Logout

Dashboard

| Employees | Clients | Form Types |

| Name | Login ID | Status | Time In Status | Error % | Processed Work | | | Avg. Process Time | | | Abandoned | | |
|---|---|---|---|---|---|---|---|---|---|---|---|---|---|
| | | | | | Apps. | Request Forms | Other Forms | Apps. | Request Forms | Other Forms | Apps. | Request Forms | Other Forms |
| admin, ldap | adminsiteldap | Admin | 1225:56:11 | 0.00 | 0 | 0 | 0 | 00:00 | 00:00 | 00:00 | 0 | 0 | 0 |
| Allen, Daren | dallen | Verification | 263:29:18 | 0.00 | 0 | 0 | 0 | 00:00 | 00:00 | 00:00 | 0 | 0 | 0 |
| Bagatelia, Dmitri | dbagatelia | Verification | 55:17:55 | 47.87 | 0 | 0 | 0 | 00:00 | 00:00 | 00:00 | 0 | 0 | 0 |
| Escamilla, Ricca | rescamilla | Verification | 49:33:24 | 0.00 | 0 | 0 | 0 | 00:00 | 00:00 | 00:00 | 0 | 0 | 0 |
| Ricard, Tom | tricard | Lunch | 1470:52:16 | 0.00 | 0 | 0 | 0 | 00:00 | 00:00 | 00:00 | 0 | 0 | 0 |
| Stone, Bronwyn | bstone | Verification | 49:34:08 | 0.00 | 0 | 0 | 0 | 00:00 | 00:00 | 00:00 | 0 | 0 | 0 |
| Walters, Phylesa | pwalters | Verification | 49:33:37 | 0.00 | 0 | 0 | 0 | 00:00 | 00:00 | 00:00 | 0 | 0 | 0 |
| Way, Adrienne | away | Admin | 00:00:20 | 16.81 | 0 | 0 | 0 | 00:00 | 00:00 | 00:00 | 0 | 0 | 0 |
| Zeemer, Jay | jzeemer | Verification | 26:05:39 | 28.82 | 0 | 0 | 0 | 00:00 | 00:00 | 00:00 | 0 | 0 | 0 |

FIGURE 13

Quality and Time Tracking System

Dashboard

| Employees | Clients | Form Types |

| ▲ Client | ▲ Error % | Work in Queue ||| Processed Work ||| Avg. Process Time ||| Abandoned |||
|---|---|---|---|---|---|---|---|---|---|---|---|---|
| | | ▲ Apps. | ▲ Request Forms | ▲ Other Forms | Apps. | Request Forms | Other Forms | Apps. | Request Forms | Other Forms | Apps. | Request Forms | Other Forms |
| ALCTAP | 0.00 | 1/0 | 0/0 | 0/0 | 0 | 0 | 0 | 00:00 | 00:00 | 00:00 | 0 | 0 | 0 |
| CALTAP | 0.00 | 1/0 | 0/0 | 0/0 | 0 | 0 | 0 | 00:00 | 00:00 | 00:00 | 0 | 0 | 0 |
| CISTAP | 1.10 | 0/0 | 0/0 | 0/0 | 0 | 0 | 0 | 00:00 | 00:00 | 00:00 | 0 | 0 | 0 |
| DEMTAP | 0.00 | 0/0 | 0/0 | 0/0 | 0 | 0 | 0 | 00:00 | 00:00 | 00:00 | 0 | 0 | 0 |
| DLPTAP | 0.00 | 0/0 | 0/0 | 4/4 | 0 | 0 | 0 | 00:00 | 00:00 | 00:00 | 0 | 0 | 0 |
| DSMTAP | 0.00 | 0/0 | 0/0 | 0/0 | 0 | 0 | 0 | 00:00 | 00:00 | 00:00 | 0 | 0 | 0 |
| EATTAP | 0.00 | 0/0 | 0/0 | 5/5 | 0 | 0 | 0 | 00:00 | 00:00 | 00:00 | 0 | 0 | 0 |
| Fixed | 0.0 | 0/0 | 0/0 | 0/0 | 0 | 0 | 0 | 00:00 | 00:00 | 00:00 | 0 | 0 | 0 |
| GDPTAP | 38.10 | 0/0 | 0/0 | 0/0 | 0 | 0 | 0 | 00:00 | 00:00 | 00:00 | 0 | 0 | 0 |
| GILTAP | 18.82 | 46/0 | 0/0 | 0/0 | 0 | 0 | 0 | 00:00 | 00:00 | 00:00 | 0 | 0 | 0 |

Main Page    Logout

FIGURE 14

Quality and Time Tracking System

Dashboard

Main Page    Logout

| Employees | Clients | Form Types |

| ▲ Form Type | ▲ Error % | Work in Queue | Work Processed | Avg. Process Time | ▲ Abandoned |
|---|---|---|---|---|---|
| Microsoft League Fees | 0.00 | 0 / 0 | 0 | 00:00:00 | 0 |
| School Invoice | 55.81 | 27 / 21 | 1 | 00:09:00 | 0 |
| TPC Generic | 0.00 | 0 / 0 | 0 | 00:00:00 | 0 |
| Tuition Application | 12.96 | 261 / 27 | 12 | 00:03:19 | 0 |
| Tuition Payment Request | 0.00 | 0 / 0 | 0 | 00:00:00 | 0 |
| Tuition Processing Request Form | 0.00 | 95 / 1 | 4 | 00:46:11 | 0 |

FIGURE 15

User ID agoslin
astamper
away
bdoucette
jnichols

Add User
Remove User

Authority Access

| Admin Access | Deny | View | Modify | Create |
|---|---|---|---|---|
| Maintain Users | ● | ○ | ○ | ○ |
| Maintain Settings | ● | ○ | | ○ |
| TPC Dashboard | ● | ○ | | |

| Form Type | Verification |
|---|---|
| Application | ☐ |
| Processing Request Form | ☐ |
| Invoice | ☐ |
| Other | ☐ |

OK    Cancel

FIGURE 16

Quality and Time Tracking System
Quality Check Verification

Course Information

| Type | Course # | Course Description | Credits | Job Related? | Tuition | Books | Fees | Estimated Total |
|---|---|---|---|---|---|---|---|---|
| N | 1 2 1 4 H | B A S I C M E D I C A L   T E R M | 3 0 | N | 1 2 7 3 5 | | | 1 2 7 3 5 |
| | | | | | | | | |
| | | | | | | | | 1 2 7 3 5 |

Did you complete a Statement of Purpose? ☐

Receiving other financial aid? ☐
Source: _____

Mandatory Fees
Subtract Financial Aid
Total Estimated Cost

<<Previous Section     Next Section>>

| Field Name | Data Entered | Corrected Data | Illegible |
|---|---|---|---|
| Course 1 - Type | G | G | ☐ |
| Course 1 - Number | 12141M | 12141M | ☐ |
| Course 1 - Description | BOSICUEDI2AL TORM | BOSICUEDI2AL TORM | ☐ |
| Course 1 - Credit/CEU | T | T | ☐ |
| Course 1 - Credits | 3.6 | 3.6 | ☐ |
| Course 1 - Job Related | N | N | ☐ |
| Course 1 - Tuition | 12~.35 | 12~.35 | ☐ |
| Course 2 - Fees | | | ☐ |
| Course 2 - Type | | | |
| Course 2 - Number | | | |

FIGURE 17

SCANNING VERIFICATION AND TRACKING SYSTEM AND METHOD

CROSS-REFERENCE TO RELATED APPLICATIONS

This application claims the benefit of U.S. Provisional Patent Application Ser. No. 60/817,875 that was filed Jun. 30, 2006, the disclosure of which is incorporated by reference in its entirety.

FIELD

The field of the disclosure relates generally to systems and methods for scanning verification and tracking. More specifically, the disclosure relates to systems and methods for quality check verification of work entered into a scanning system.

BACKGROUND

This section provides a background or context to the invention recited in the claims. Unless otherwise indicated, what is described in this section is not prior art to the claims and is not admitted to be prior art by inclusion in this section.

U.S. Pat. No. 7,013,045 to Sommer et al. entitled "Using multiple documents to improve OCR accuracy" indicates that in many document imaging systems, large numbers of forms are scanned into a computer, which then processes the resultant document images to extract pertinent information. Typically, the forms comprise preprinted templates, containing predefined fields that have been filled in by hand or with machine-printed characters. Before extracting the information that has been filled into any given form, the computer must first know which field is which. Only then can the computer process the information that the form contains. The computer then reads the contents of the fields in the form, typically using methods of optical character recognition (OCR) and arranges the OCR results in a table or database record. In many of these imaging systems, it is crucial that the information in the forms be read out correctly. For this purpose, automated OCR is commonly followed by manual verification of the OCR results. Often, the computer that performs the OCR also generates a confidence rating for its reading of each character or group of characters. Human operators perform the verification step, either by reviewing all the fields in the original document, and correcting errors and rejects discovered in the OCR results, or by viewing and correcting only the characters or fields that have a low OCR confidence level. Since verification of the OCR is typically the most costly part of the process, it is generally desirable to attain the highest possible level of confidence in the automated processing phase, and thus to minimize the portion of the results that must be reviewed by a human operator.

Other documents describing the need for improved productivity of human operators in verifying OCR results include U.S. Pat. No. 6,351,574 to Yair et al. entitled "Interactive verification of OCRed characters" and U.S. Pat. No. 5,455,875 to Chevion et al entitled "System and method for correction of optical character recognition with display of image segments according to character data."

SUMMARY

Exemplary embodiments described herein are directed to a transaction processing quality and time tracking system that presents, monitors and tracks quality of work. The system also allows managers to assign work in queue to employees by skill set. The system allows a user to validate the accuracy of work that has been read by a scanning system and to quality check the work of other users.

In an exemplary embodiment, a device for assigning a task to a user to verify information from a scanned document is provided. The device includes, but is not limited to, a computer-readable medium having computer-readable instructions therein and a processor. The processor is coupled to the computer-readable medium and is configured to execute the instructions. The instructions are configured to cause a computing device to present an image, a data item, and a data field to a user, the image associated with at least a section of a scanned document, the data item identified from a portion of the image, and the data field associated with the data item, to receive a second data item, the second data item entered by the user in the data field the second data item indicating a correction to the data item to reflect the portion of the image; to update an error rate based on the received second data item; to select the user to process a task based on the updated error rate; and to present the task to the selected user.

A method of assigning a task to a user to verify information from a scanned document is provided. An image, a data item, and a data field are presented to a user. The image is associated with at least a section of a scanned document. The data item is identified from a portion of the image. The data field is associated with the data item. A second data item is received. The second data item is entered by the user in the data field and indicates a correction to the data item to reflect the portion of the image. An error rate is updated based on the received second data item. The user is selected to process a task based on the updated error rate. The task is presented to the selected user.

In yet another exemplary embodiment, a computer-readable medium is provided. The computer-readable medium has computer-readable instructions therein that, upon execution by a processor, cause the processor to implement the operations of the method of assigning a task to a user to verify information from a scanned document.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

FIG. 5 is a quality check verification page in the exemplary scanning verification and time tracking system of FIG. 1.

FIG. 6 is a school search page in the exemplary scanning verification and time tracking system of FIG. 1.

FIG. 7 is an employee select page in the exemplary scanning verification and time tracking system of FIG. 1.

FIG. 8 is an application list page in the exemplary scanning verification and time tracking system of FIG. 1.

FIG. 9 is an invoice processing page in the exemplary scanning verification and time tracking system of FIG. 1.

FIG. 10 is a second monitor interface in the exemplary scanning verification and time tracking system of FIG. 1.

FIG. 11 is a maintain settings page in the exemplary scanning verification and time tracking system of FIG. 1.

FIG. 12 is an add settings page in the exemplary scanning verification and time tracking system of FIG. 1.

FIG. 13 is an employee tab portion of a dashboard interface in the exemplary scanning verification and time tracking system of FIG. 1.

FIG. 14 is a client tab portion of a dashboard interface in the exemplary scanning verification and time tracking system of FIG. 1.

FIG. 15 is a form type tab portion of a dashboard interface in the exemplary scanning verification and time tracking system of FIG. 1.

FIG. 16 is a maintain user page in the exemplary scanning verification and time tracking system of FIG. 1.

FIG. 17 is a quality check verification interface in the exemplary scanning verification and time tracking system of FIG. 1.

DETAILED DESCRIPTION

Figure 1:
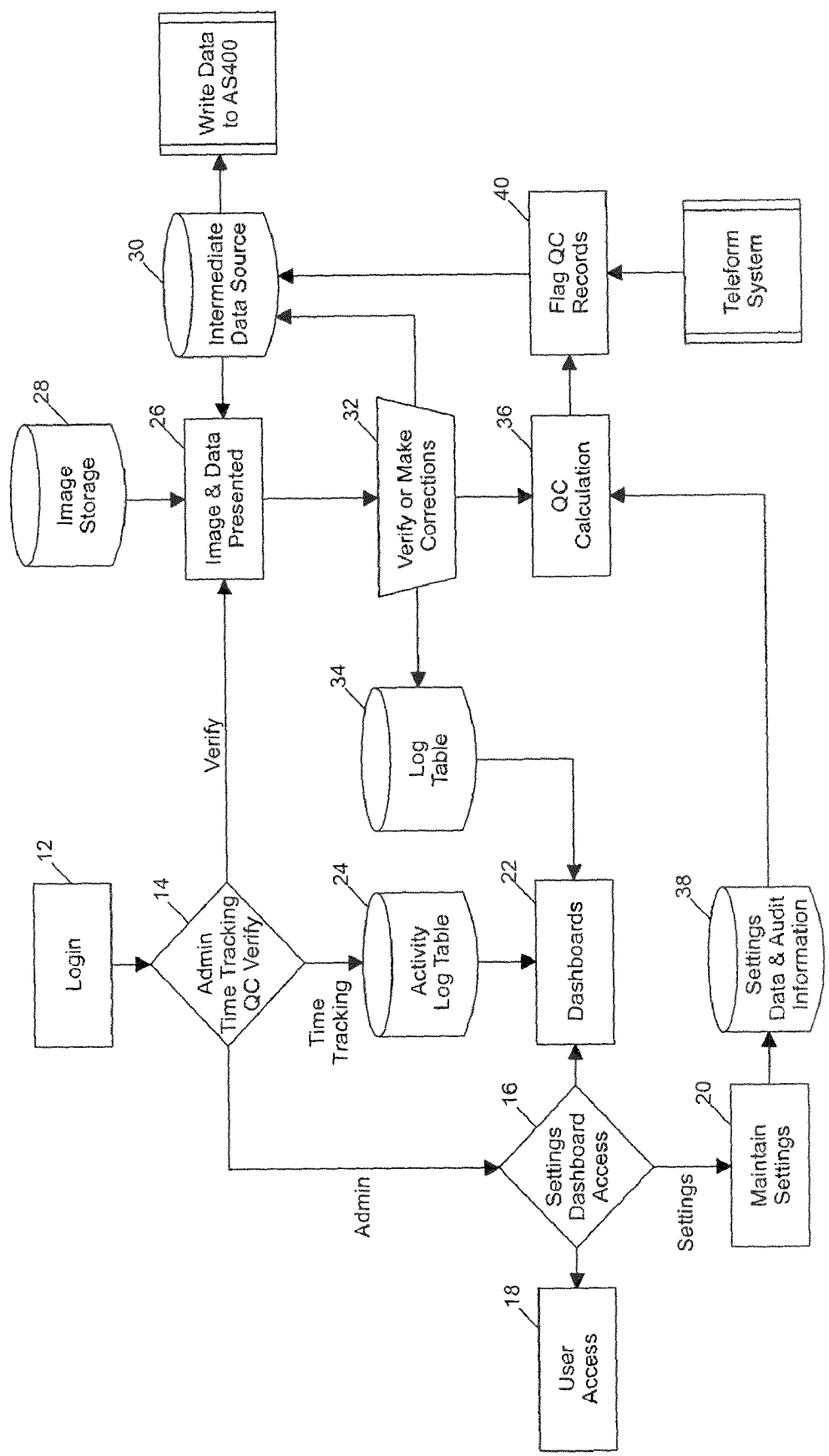
FIG. 1 is a flow diagram depicting operations performed in a scanning verification and time tracking system according to an exemplary embodiment.

An exemplary quality and time tracking system allows a user to validate the accuracy of work that has been read by a scanning system and to quality check the work of other users. The verification of optical character recognition (OCR) data takes place prior to the data being available for final processing (adjudication). In an exemplary embodiment, the system presents to the user a scanned image and data that was read or entered based on that image. On a field by field basis the user either indicates that the data was read or entered correctly or enters new data for that field if the original data is not correct. The new data does not replace the original data, instead a new record is created so that the original data is preserved. For items that are processed through a second quality check and have changes to the data, the system creates records for one piece of work (i.e., OCR data, first verification changes, second verification changes).

An error rate is calculated based on the number of data elements or fields evaluated during the second pass. The error rate is the number of corrected fields divided by the total number of fields evaluated (i.e., the total number of fields on a form). An error rate is calculated for each employee, client, and form type. Each time a piece of work is completed, the quality control validation updates the error rates for the employee, client, and form type.

According to an exemplary embodiment, quality control verification work is pushed or assigned to each user based on the characteristics of the piece of work and the efficiency of the user and what each user is allowed or given rights to process. The user's efficiency is a combination of their error rate and average time to process each form type. It is preferable to assign work to the most efficient user while not letting items remain in the queue beyond a certain period of time.

In the exemplary embodiment, a form type indicator is a required data element for each piece of work. An interrogation point is used to determine the type of form if the OCR cannot determine the form type. Example form types include an application, an invoice, a processing request form, or a generic coversheet, each having an active or an inactive attribute. The form type flag is set based on the result of this interrogation. Once the form type is determined, the system processes accordingly based on the determined form type. Active forms are processed using all data elements on the form. Inactive forms and non-forms are processed and generally require a minimum number of data elements. The data entry fields collect the appropriate data elements for each form type.

The system can track the activity and time of employees. Users indicate when they move from one activity to another and the system tracks the time the employee spent in a particular activity. With this information, an employee's entire time is available. If a user available for verifying work is not assigned after ten seconds, the user's status is changed to "idle."

Images that are identified as "no ID match" are saved under the client in the image repository. Both an image identifier and client name are logged. A job is created that can be scheduled and collects any "no ID match" images, compresses them, encrypts them, and makes them available to the client by placing the images in the client's folder on a file transfer protocol server. Once an image has been made available to the client, it is not processed on any subsequent runs of the job. An e-mail message is sent to the client indicating that there are images available for retrieval. A log is created of the date and time the images are processed, the e-mail address the notification message was sent to, the date and time of the notification message, and any additional information required to locate the images. For images where an employee ID cannot be found but including an e-mail address, a data entry field collects the e-mail address. Using the e-mail address and the client indicator, a file is created that is used to create an email correspondence.

FIG. 1 illustrates a flow diagram depicting operations performed in an exemplary scanning verification and time tracking system. Additional, fewer, or different operations may be performed depending on the particular implementation. After a login operation 12, a determination is made at an operation 14 whether to proceed to administration, time tracking, or quality control verification. If administration is selected, a determination is made in an operation 16 whether to provide access to a settings interface, a dashboard interface, or an access interface. User access operation 18, settings operation 20, and dashboard operation 22 can be performed. Returning to operation 14, if time tracking is selected, an activity log table operation 24 is engaged. If quality control verification is selected in operation 14, image and data is presented in an operation 26. Images can be retrieved from image storage 28 and data can be retrieved from an intermediate data source 30. The data can be written to a separate system, such as a separate computing system which may include an AS 400 system. In an operation 32, verification of the OCR or correction of the OCR is performed. Actions are recorded in a log table 34. A quality control calculation 36 is performed using settings and audit information 38. Depending on the quality control calculation 36, quality control records can be flagged in an operation 40.

Figure 2:
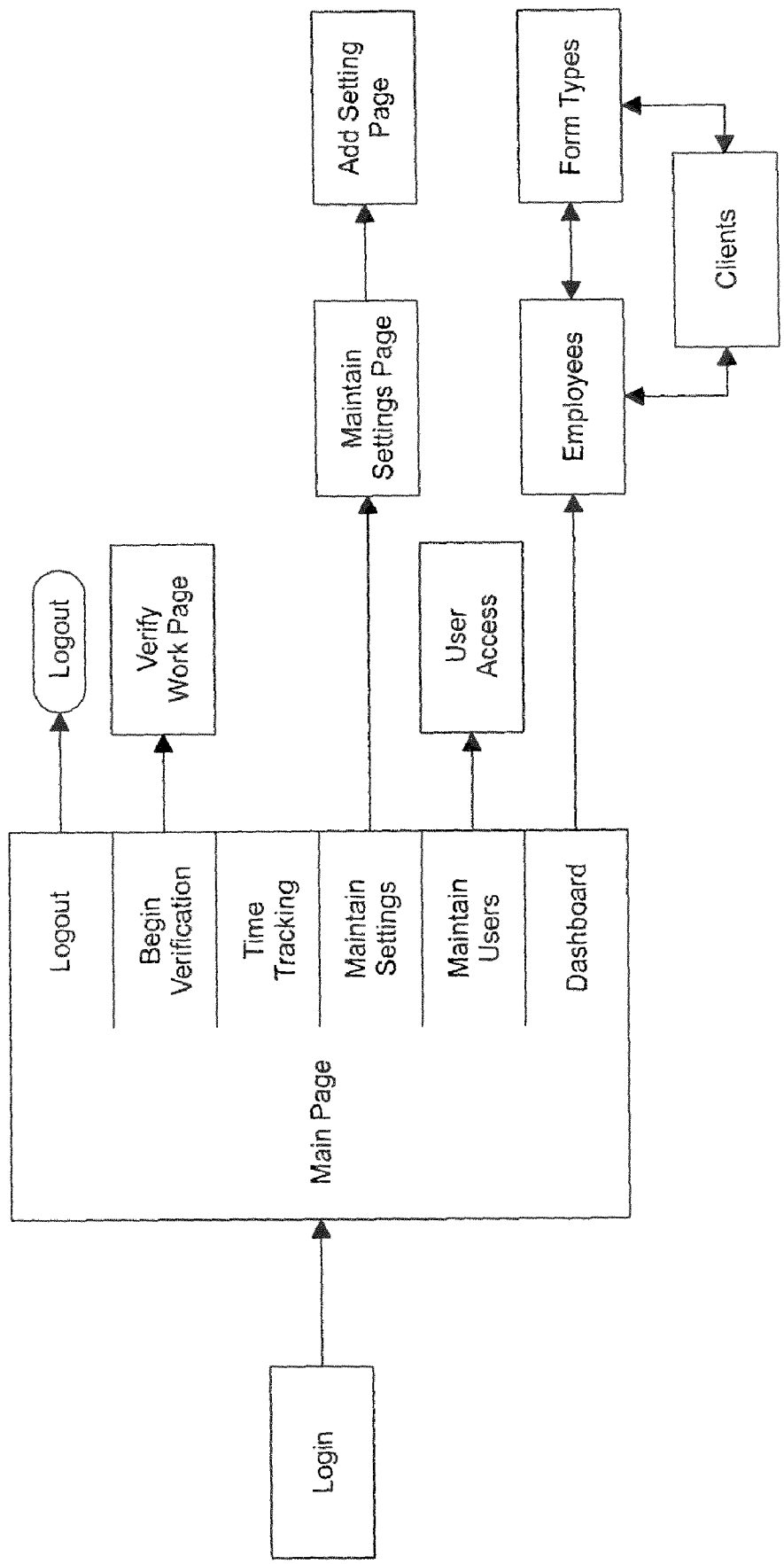
FIG. 2 is a site flow diagram depicting pages in the exemplary scanning verification and time tracking system of FIG. 1.

FIG. 2 illustrates a site flow for a quality and time tracking system. From a main page, accessible operations include log out, begin verification, time tracking, maintain settings, maintain users, and dashboard. From the main page, other pages can be accessed by selecting one of these options. A begin verification option engages a verify work page where verification of OCR results can be done. A maintain settings option engages a page which allows for changes in operational settings. A maintain users option provides for control of which users can access the system and which parts of the system. A dashboard option engages an interface which enables the user to view statistical information about the work being processed in the system. This statistical information allows for a manager or supervisor to monitor work through the organization by client, form type, and/or user (i.e., employee).

Figure 3:
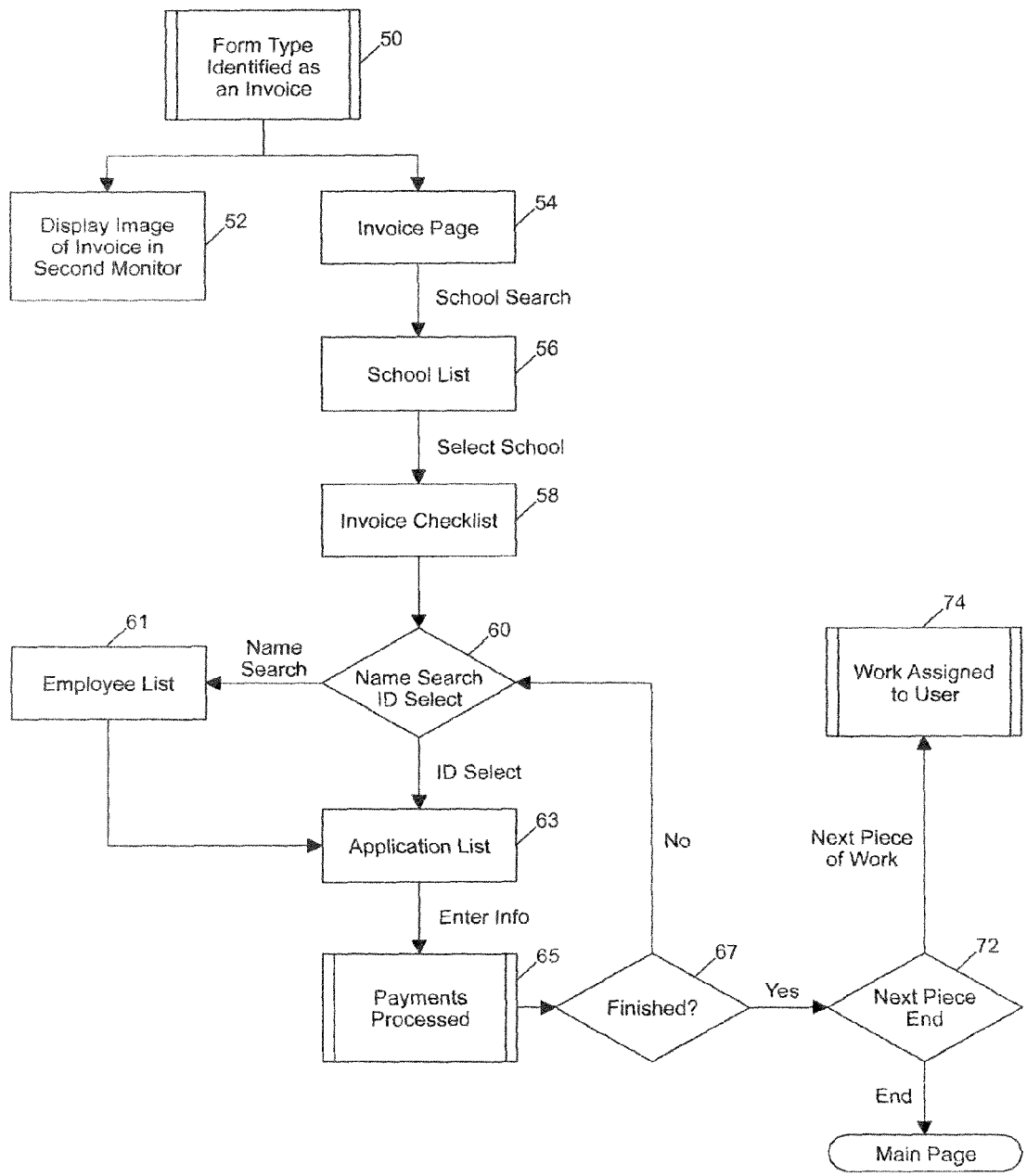
FIG. 3 is a flow diagram depicting invoice processing operations in the exemplary scanning verification and time tracking system of FIG. 1.

FIG. 3 illustrates a flow diagram depicting operations performed in an invoice process in the exemplary quality and time tracking system. Additional, fewer, or different operations may be performed depending on the particular implementation. In an operation 50, a form type is identified as an invoice. An image of the invoice is displayed in a second monitor in an operation 52. In a primary monitor, the invoice page is displayed in an operation 54. A school search is performed and a school list is provided in an operation 56. Once a school is selected, an invoice checklist is provided in an operation 58. A main search or an identifier search can be selected in an operation 60. A main search results in a display of an employee list in an operation 61 whereas an identifier search provides an application list in an operation 63. Once an employee list is provided, an employee can be selected and an application list presented. Information is then entered and payments are processed in an operation 65. A determination is made in an operation 67 whether the invoice process has been completed. A determination is made in an operation 72 whether to end or provide a next piece of work in an operation 74.

Figure 4:
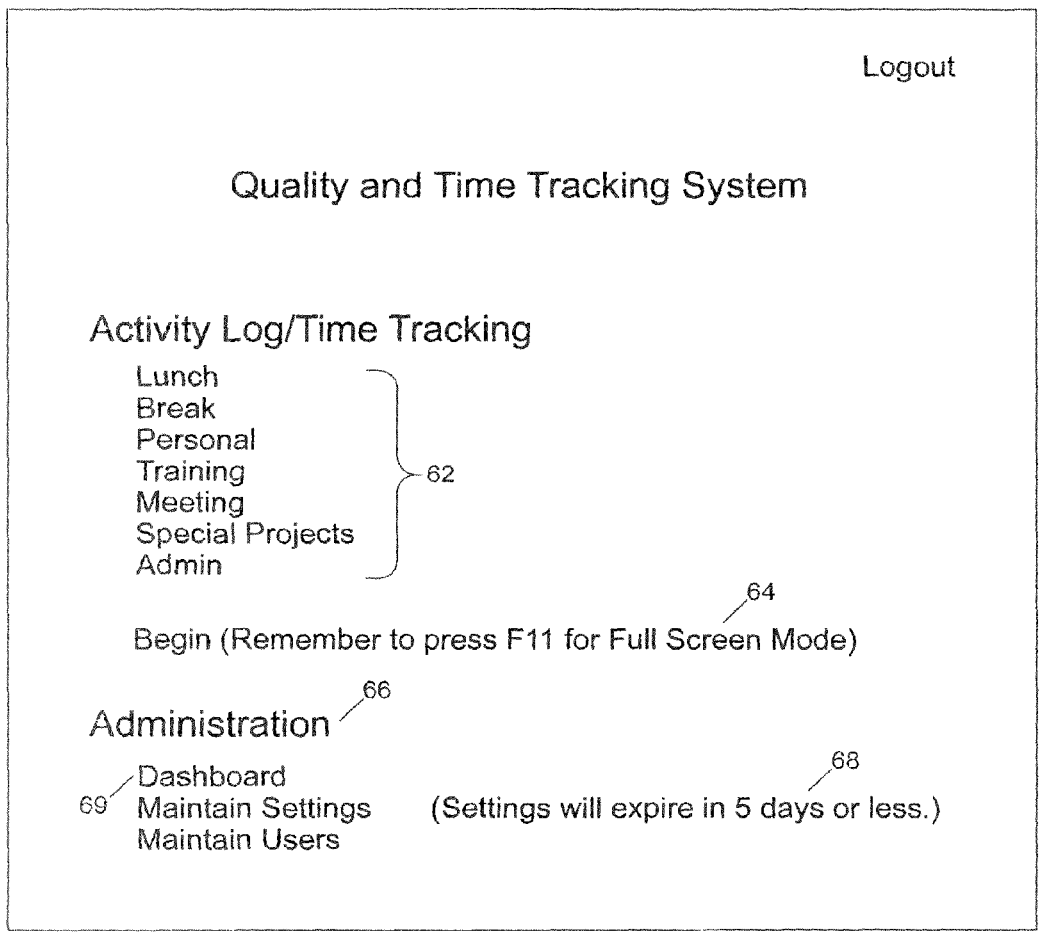
FIG. 4 is a menu page in the exemplary scanning verification and time tracking system of FIG. 1.

FIG. 4 illustrates a menu page. Links 62 can be selected to identify the user's status. If the users status is currently "Lunch", the link is changed from a black to a green color. If the user's status is currently "Break", the link is changed from a black to a green color. If the user's status is currently "Personal", the link is changed from a black to a green color. If the user's status is currently "Training", the link is changed from a black to a green color. If the user's status is currently "Meeting", the link is changed from a black to a green color. If the user's status is currently "Special Projects", the link is changed from a black to a green color. If the user's status is currently "Admin", the link is changed from a black to a green color.

Begin link 64 is displayed if the user has any check boxes for verification checked on the maintain users page. When the begin link 64 is clicked, the system proceeds to the verification page and presents the next piece of work in the queue for the user. An admin link 66 is displayed if the user has access to any administration links. Settings expiration message 68 is displayed if any settings expire in 5 days or less. A dashboard link 69 can be selected to go to an employees tab of a dashboard interface. If the user does not have administrative access to the page, the dashboard link 69 is not displayed. Other links, such as maintain settings link and maintain users link can also be utilized.

FIG. 5 shows an exemplary interface for quality check verification. If the user decides to leave the interface, the user can click a "Main Page" link. If verification is not complete, a message such as the following is displayed: "Verification is not complete and will not be saved. Choose Ok to go to the main page without saving. Choose Cancel to return to verification." If the user chooses to return to the main page without completing the verification of the current piece of work, a log record is created indicating the work was abandoned for the employee, client and form type.

The interface includes an image display area 70 which displays the image of the piece of work. The image can be separated into sections to make it legible and still allow room for the fields to be displayed on the screen. When a user clicks on the image, the image or image section will present display area 70 in a second window when working on a system with one monitor. When using two monitors, the image display area 70 automatically opens a new window on the second monitor and displays a zoomed in version of the image. A previous section link 72 is included which, when clicked, retains the data elements for the current section and presents the previous image section for the piece of work. The image and corresponding data elements for that image section are displayed. If there are multiple pages of data elements for one image section, the first set of data elements for the image section are displayed. If there are no previous image sections, the previous link 72 is not displayed. A next section link 74 is included which, when clicked, verifies that all data elements have been verified (correct, corrected data, or illegible have a value) If all data elements have not been verified, a message window with the text "Not all data elements have been verified. Please verify the remaining data elements." is displayed. Data elements that were not verified are highlighted in red. If all data elements have been verified, the next image section for the piece of work is presented. If there are no additional image sections, the next section link 74 is not displayed.

A field name list 73 displays the list of field names for the data elements that are being verified for the image section that is displayed. If there are more field names than easily fit on the screen, the next group of field names are displayed for the image section. A current data list 75 displays the current data for the piece of work (OCR or first verification) that was entered for the fields corresponding to the field names and image section. A data field 77 provides a text box for entering the correct data when the data in the current data field does not match the data that is shown in the image section. The current data value for the data element in the field is displayed.

If a particular field has focus (or, in other words, the currently examined field) and a tab is pressed, the illegible indicator is presented for the data element. If the field has focus and backspace is pressed, the value is deleted from the field. If the field has focus and the user types a new value for the data element, the old value is replaced with the new one. When clicked, the focus changes to the new field.

An illegible indicator 79 provides a check box used to indicate that the portion of the image corresponding to the data element is not legible. When the element has focus and the space bar is pressed, the current box is changed to checked and a cursor moves to the next corrected data field. If it is the last illegible indicator in the column, the next group of data elements is displayed. If it is the last illegible indicator for the piece of work and there are no more data elements to correct, the focus is changed to the next piece of work link.

A next piece of work link is provided that, when clicked, verifies that all data elements have been verified (focus has been given to every data element). If not al data elements have been verified, a message window is displayed with the text "Not all data elements have been verified. Please verify the remaining data elements." Data elements that were not verified are highlighted in red.

If all data elements have been verified, a message window is displayed with the text "All data elements have been verified. Choose Ok to save work. Choose Cancel to return to the current piece of work." When Ok is chosen, the data elements and all log information (number of corrected elements, start and end time for correction, etc.) are saved for the piece of work. The next piece of work from the queue is retrieved. The first image section and set of data elements are displayed. When "End" is clicked, a check is made that all data elements have been verified (focus has been given to every data element). If not all data elements have been verified, a message window is displayed with the text "Not all data elements have been verified. Please verify the remaining data elements." All data elements that were not verified are highlighted in red. If all data elements have been verified, a message window is displayed with the text "All data elements have been verified. Choose Ok to save work. Choose Cancel to return to the current piece of work." When Ok is chosen, the data elements and all log information (number of corrected elements, start and end time for correction, etc.) for the piece of work are saved.

FIG. 6 illustrates an interface having a select box for indicating in which state the school is located. This data is used to limit search results. A search field based on school name can also be utilized. If less than three characters are entered, a message window is displayed with the text: "At least three characters are required to search." If no results are found, a message window is displayed with the text "No results matched the search criteria. Please search again using different criteria." A select box is presented that contains the results of the school search, including the school name, street address, city, state, and vendor number. When clicked, the school is selected and the page is refreshed with the school information, and the enter invoice window is launched. For the school that is selected, the school number is retrieved. The school number may be used for all records created during the processing of this invoice.

An invoice number field is a text box for the invoice number. The invoice number may be used for all records created during the processing of this invoice. An invoice checklist is provided including a display of the list of active checklist items for the client based on the code file. A check box is included to indicate if the checklist item requirement has been met. When a check box has the focus of the interface, pressing the space bar changes the check box to checked. When the "Enter" button is clicked, the invoice number and checklist results are stored so that they can be used when creating records during the processing of this invoice. If it is necessary for the client, the invoice is checked to see if it is duplicated.

FIG. 7 illustrates an interface including an employee ID field for entering the employee ID to select an employee name field. An employee name field displays the name of the employee that was selected from the select employee window. If the select operation does not return an employee, "No employee match found." is displayed. An email address field is provided for the entry of the employee's email address if one is present on the application. This email address is used when notifying the employee that their application did not contain a valid employee ID.

FIG. 8 illustrates an interface displaying invoice detail information for a particular employee. The term start column displays the term start date for the employee. The table can be sorted in descending order by the term start date, the most recent being on top. A term end column displays the term data of the applications for the employee. A course 1 column displays the course 1 information of the applications for the employee. The course 1 can be displayed as course number and course name. A course 2 column displays the course 2 information of the applications for the employee. Other courses can be displayed. An amount field displays the amount due from the invoice.

When an invoice complete yes button is clicked indicating the piece of work is completed, log files are updated. A more work window is launched and focus is given to the next piece of work button. When an invoice complete no button is clicked, a select employee window is launched and focus is given to the employee ID field. When a next piece of work button is clicked, the next piece of work is retrieved from the queue. The first image section and set of data elements are displayed. The focus to the first corrected data field is set, if the next piece of work is not an invoice.

FIG. 9 shows an interface used for invoice processing. When a change school link is clicked, the school search window is launched. When the school is selected, the interface returns to the invoice quality control page and displays the school information for the school that was selected. An invoice number field displays the invoice number for the associated invoice in a text field.

Checklist items displays checklist items and responses saved when the invoice was first entered. When Tab is pressed, focus is given to the check box for the next checklist item. If it is the last checklist item, focus is given to the first amount field. When the space bar is pressed or the box clicked, the checkbox is changed from checked to unchecked or unchecked to checked. When a change employee link is clicked, the Select Employee window is launched for invoices. When the employee is selected in the window the interface goes to the application list for the selected employee. When an amount is entered on the application list page, the interface returns to the invoice quality control page and replaces the employee and application information for the employee for which the change employee link was clicked.

An employee field displays the employee identifier and employee name for the invoice record. Course info displays the course information for the application corresponding to the invoice record. For any courses that are blank, no information is displayed. When a change application link is clicked, the interface goes to an application list page for the employee. When an amount is entered on the application list page, the interface returns to the invoice quality control page and replaces the application information for the employee for which the change application link was clicked.

When a next piece of work link is clicked, there is a check that all data elements have been verified (focus has been given to every data element). If not all data elements have been verified, a message is displayed with the text "Not all data elements have been verified. Please verify the remaining data elements." In an exemplary embodiment, all data elements that were not verified are highlighted in red.

If all data elements have been verified, a message window displays the text "All data elements have been verified. Choose Ok to save work. Choose Cancel to return to the current piece of work." When Ok is chosen, the data elements and all log information (number of corrected elements, start and end time for correction, etc.) are saved for the piece of work. The next piece of work is retrieved from the queue.

FIG. 10 illustrates a screen display of a second monitor interface presenting a scanned image. The scanned image can be rotated and viewed by zooming in or out. FIG. 11 illustrates a maintain settings page which allows a user to set default settings for form types, clients, and employees. The settings include the sample size when calculating the error rate and the number of pieces of work to verify based on a given error rate. FIG. 12 illustrates an add settings page which allows the user to set the piece of work attributes for a new settings record.

FIG. 13 illustrates an interface of an employee tab portion of a dashboard page. A client tab portion of the dashboard page is shown in FIG. 14 and a form types tab portion of the dashboard page is shown in FIG. 15. The dashboard interface presents statistical information about the work moving through the system. The statistical information is refreshed based on a predetermined time frame. The statistical information allows management to monitor work through the organization by client, form type, and user. Data presented on the dashboard interface is broken down into three categories: employee (FIG. 13), client (FIG. 14), and form type (FIG. 15).

Monitored work allows management to see the state of an employee and how well an employee is performing. As described with reference to the menu page of FIG. 4, employee states can include verification, lunch, break, personal, meeting, etc. The dashboard interface presents how long a user/employee is in each state. An error rate is calculated for each employee after a piece of work is completed. The error rate is based on corrections made to a piece of work during additional rounds of verification. Along with error calculations per employee, error calculations per form type are also available. Error calculations per form type allow management to assess if there are quality issues with particular types of forms or documents. Error calculations by client are also available on the dashboard interface. Error calculations by client allow management to determine if there is an issue by client. Any one of the error calculations gives management the opportunity to react as soon as issues begin to arise. Management has the opportunity to increase the quality checks by form, client, employee, or any combination thereof to correct quality issues that are being seen. Using the dashboard interface allows management to make sure that the organization is meeting or exceeding contractual service level agreements on a daily basis.

Average process time for like pieces of work is displayed on the dashboard. The average process time is broken down by different form types. This statistic allows management to view each user/processor for efficiency. By way of example, referring to the dashboard interface of FIG. 13, a login ID column displays login IDs of users who have access to the system. A status column displays the status of the user. If the user is available for verification work but no work has been assigned in ten seconds, the user's status is changed to "idle". Possible status values include: logged out, lunch, break, personal, training, meeting, special projects, admin, idle, and verification. A time in status column displays the length of time that the user has been in their current status. An error column displays a current error percent for the user. The error percent is the number of data elements requiring correction per total number of data elements verified during the second pass. The total number of data elements verified is a rolling sample size based on the settings for the user.

A processed work column displays the number of applications request forms, and other forms that have been processed by the user for the current day. An average process time column displays the average amount of time for the user to process a piece of work for the current day. The average time is determined by adding the time taken to process all pieces of work for the day and dividing by the total number of pieces of work. An abandoned column displays the number of applications, request forms, and other forms that have been abandoned by the user for the current day.

FIG. 14 illustrates an interface of a client tab portion of a dashboard interface. A client column displays names of active clients. An error column displays the current error percent for the client. The error percent is the number of data elements requiring correction per total number of data elements verified. The total number of data elements verified is a rolling sample size based on the settings for the client. A work in queue column displays the number of applications that are currently in the queue to be verified or quality checked for the client. A processed work in queue column displays the number of process request forms that are currently in the queue to be verified or quality checked for the client.

An average process time column displays the average amount of time to process an application for the client for the current day. The average is determined by adding the time to process all applications for the day and dividing by the total number of applications. An abandoned column displays the number of applications that have been abandoned for the client for the current day.

FIG. 15 illustrates an interface of a form type tab portion of the dashboard interface. A form type column displays the names of the active form types. An error column displays the current error percent for the form type. The error percent is the number of data elements requiring correction per total number of data elements verified. The total number of data elements verified is a rolling sample size based on the settings for the form type. A work in queue column displays the number of pieces of work that are currently in the queue to be verified or quality checked for the form type. A work processed column displays the number of pieces of work that have been processed for the form type for the current day. An average process time column displays the average amount of time to process a piece of work for the form type for the current day. The average time is determined by adding the time taken to process all pieces of work for the day and dividing by the total number of pieces of work. An abandoned column displays the number of pieces of work that were abandoned for each form type for the current day.

FIG. 16 illustrates a maintain user page. A user ID list provides a list of user IDs of users who have been added to the system. Users can be added or removed. Buttons are presented to identify the authority level of the user for the maintain users page. If a deny button is selected, the maintain users link is not provided on the main page for that particular user. If the view button is selected and the maintain users page is accessed, the add user and remove users buttons are not displayed. The authority access settings for a selected user are displayed but cannot be changed. If the modify button is selected and the maintain users page is accessed, the add user and remove users buttons are not displayed. The authority access settings for a selected user are displayed and can be changed. If the create button is selected and the maintain users page is accessed, the add user and remove user buttons are displayed. The authority access settings for a selected user are displayed and can be changed.

Similarly, buttons are used to establish access to the maintain settings page. For example, if the deny button is selected, the maintain settings link is not displayed on the main page. If the View button is selected, the maintain settings link is displayed on the main page. When the maintain settings page is accessed, the settings are displayed but cannot be changed. If the create button is selected, the maintain settings link on the main page is displayed. When the maintain settings page is accessed, the settings are displayed and can be added and changed. Dashboard authority refers to the ability to access the dashboard page. Verification access indicators are included using check boxes to indicate if a user has authority to perform verification in the system. The check boxes determine which form types the user can verify.

FIG. 17 illustrates an exemplary quality check verification interface. The interface includes a window 1710 which displays an image. The image is preferably not an entire form or entry, rather it is only a portion of a larger image. In at least one exemplary embodiment, the image is broken apart into logical sections for verification. As each image section is displayed, only the data elements required for verification are presented. Presenting images in logical sections provides a security benefit because, by separating the images, the user of the system does not have access to all data elements or the entire image at one time.

From a security perspective, the separation process allows sensitive data to be compartmentalized and isolated to a selected population of users, while non-sensitive data can be processed by a different, larger, and perhaps less trusted population. By separating the data and images, no single user has all of the data at one time. From a workflow perspective, a single piece of work can be distributed to multiple users allowing the workload to be more evenly distributed. In another embodiment, images are separated into logical sections and each section is presented to different users of the system. In this embodiment, an end user never sees or knows all of the different sections of a document/form.

Within the system, work is assigned to users based on a weighting algorithm. The algorithm can be based on: skill set, time in queue, user error on form type, etc. Changing weighting or importance of different items in the algorithm changes how work is selected to move through the system.

In an exemplary embodiment, when determining whether a piece of work receives a quality check, three factors are taken into account: the type of form, the client, and the first pass verifier. For each of these factors, an error rate has been calculated based on prior pieces of work. This error rate is located in a table to find the corresponding quality check frequency. Each factor has a default quality control frequency. Additionally, specific quality control frequencies can be created for each factor or any combination of factors, which allows the quality check of a specific form, client, or verifier to be monitored and adjusted.

The verification task presents a user (verifier) with an image and its related data. As mentioned, preferably, the image presented is not the complete image or set of data elements. Based on a form identifier, the system separates the image and its related data elements into defined sections. The verifier is presented with and works on one section at a time. After all of the sections have been validated, they are assembled into a complete set of data.

Along with the weighting, verification work is pushed or assigned to each user based on the characteristics of the piece of work and the efficiency of the user. The user's efficiency is a combination of their error rate and average time to process each form type. The preference is to assign work to the most efficient user while not letting items remain in the queue beyond a certain period of time. The work distribution portion of the system incorporates a weighting process so that of the available pieces of work, a particular user is given the piece for which they are most efficient. Efficiency is a combination of error rate and average time to process. In addition to the verifiers efficiency, the length of time a piece of work has been in the queue is part of the weighting. The longer a piece of work is in the queue the more likely it is that it will be assigned to the verifier.

In an exemplary weighting algorithm, a weight (W) is calculated for each piece of work in the queue. The work queue is resorted based on the W calculated for the current verifier. Once the queue is resorted, the top piece of work is assigned to the current verifier. Formulaically, weight is represented as:

$$W=(xER+yPT)/zTIQ$$

where:
ER=Error Rate of the user for the form ID
PT=Process Time=(user's average time to process type of work)/(standard time to process type of work)
TIQ=Time In Queue
x=the error rate weighting
y=the processing time weighting
z=the time in queue weighting Each form identifier has an associated error rate, processing time, and time in queue weighting, which allows the importance of speed, accuracy, or age to vary for each form identifier.

Advantageously, the exemplary systems provide a tool that sets a ladder which determines the amount/quantity of work that is sent through a quality check queue. The quality check queue ladder has a predetermined default for client, form, and employee. The ladder is based on a rolling number of pieces of work along with an error rate. As the error rates increase (worsens), the amount of work sent through the quality check queue automatically increases. The quality check administration tool allows ladders to be set by form, employee, client or any combination thereof. Benefits to management with this tool include the ability to 100% quality check for new employees, the ability to scale up or scale down the amount of work put into the quality control queue making it possible to control the amount of work that needs to be completed, the ability to set quality check settings with an expiration date, the ability to increase or decrease the sample size used to determine work that is sent to the quality check queue, and the ability to increase or decrease the sample size used to determine error rates for employees, forms, and clients.

In an exemplary embodiment, an auto adjudication rules engine is utilized in the system to provide a systematic disposition of applications and payments. Data that is collected from documents or forms is sent to the adjudication rules engine. The engine accepts data, applies the rules and systematically provides a decision or disposition of "Approved" or "Rejected". An example of rules in the rules engine is a client policy for tuition assistance. The policy can be broken down in to rules, including employment status, length of employment, eligible schools, eligible majors, and tuition caps. Rules are configured for each client. The configuration of the rules is what is used to make decisions against a data set.

The word "exemplary" is used herein to mean serving as an example, instance or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments. The term "computer readable medium" can include, but is not limited to, magnetic storage devices (e.g., hard disk, floppy disk, magnetic strips, . . . ), optical disks (e.g., compact disk (CD), digital versatile disk (DVD), . . . ), smart cards, flash memory devices, etc. Additionally, it should be appreciated that a carrier wave can be employed to carry computer-readable media such as those used in transmitting and receiving electronic mail or in accessing a network such as the Internet or a local area network (LAN).

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of assigning a task to a user to verify information from a scanned document, the method comprising:
    presenting an image, a data item, and a data field to a user at a device, the image associated with at least a section of a scanned document, the data item identified from a portion of the image, and the data field associated with the data item;
    determining the data item automatically;
    receiving a second data item at the device, the second data item entered by the user in the data field, the second data item indicating a correction to the data item to reflect the portion of the image;
    updating an error rate based on the received second data item;
    selecting the user to process a task based on the updated error rate; and
    presenting the task to the selected user at the device.

2. The method of claim 1, wherein the data item is determined automatically using an optical character recognition process.

3. The method of claim 1, further comprising, before presenting the image, the data item, and the data field to the user at the device:
    presenting the image, a first data item, and a first data field to a first user at a first device, the first data item identified from the portion of the image, and the first data field associated with the first data item; and
    receiving the data item at the first device, the data item entered by the first user in the first data field, the data item indicating a correction to the first data item to reflect the portion of the image.

4. The method of claim 3, further comprising updating a second error rate based on the received data item.

5. The method of claim 3, further comprising determining the first data item automatically.

6. The method of claim 5, wherein the first data item is determined automatically using an optical character recognition process.

7. The method of claim 5, further comprising updating a second error rate based on the received data item wherein the second error rate is associated with at least one of a form type of the scanned document and a client associated with the scanned document.

8. The method of claim 3, wherein the second error rate is associated with at least one of the first user, a form type of the scanned document, and a client associated with the scanned document.

9. The method of claim 1, wherein the error rate is associated with at least one of the user, a form type of the scanned document, and a client associated with the scanned document.

10. The method of claim 1, further comprising receiving an indicator at the device, the indicator selected by the user, the indicator indicating the data item is illegible.

11. The method of claim 1, further comprising, before presenting the image, the data item, and the data field to the user at the device:
    separating the scanned document into a plurality of sections;
    wherein the image includes only a section of the plurality of sections.

12. The method of claim 11, further comprising, after separating the scanned document into the plurality of sections:
    selecting the section from the plurality of sections; and
    selecting the user for presentation of the selected section based on a security status of the user.

13. The method of claim 12, further comprising, after selecting the user for presentation of the selected segment:
    selecting a second section from the plurality of sections; and
    selecting a second user for presentation of the selected second section based on a second security status of the second user.

14. The method of claim 1, further comprising:
    calculating a weighting factor for a plurality of tasks in a queue, the task selected from the plurality of tasks;
    wherein selecting the second user to process the task is based on the calculated weighting factor for the task which comprises the updated error rate.

15. The method of claim 14, wherein the weighting factor further comprises a time associated with the second user processing a second plurality of tasks.

16. The method of claim 14, wherein the weighting factor further comprises a time that the task has been in the queue.

17. The method of claim 1, wherein the task is verifying a correctness of a second data item based on a second image.

18. A device for assigning a task to a user to verify information from a scanned document, the device comprising:
    a non-transitory computer-readable medium having computer-readable instructions stored therein which are programmed to present an image, a data item, and a data field to a user, the image associated with at least a section of a scanned document, the data item identified from a portion of the image, and the data field associated with the data item;
    receive a second data item, the second data item entered by the user in the data field, the second data item indicating a correction to the data item to reflect the portion of the image;
    update an error rate based on the received second data item; select the user to process a task based on the updated error rate; and present the task to the selected user; and
    a processor, the processor coupled to the computer-readable medium and configured to execute the instructions.

19. A non-transitory computer-readable medium including computer-readable instructions that, upon execution by a processor cause the processor to assigning a task to a user to verify information from a scanned document, the instructions configured to cause a computing device to:
    present an image, a data item, and a data field to a user, the image associated with at least a section of a scanned document, the data item identified from a portion of the image, and the data field associated with the data item;
    receive a second data item, the second data item entered by the user in the data field, the second data item indicating a correction to the data item to reflect the portion of the image;
    update an error rate based on the received second data item; select the user to process a task based on the updated error rate; and present the task to the selected user.

* * * * *